(12) United States Patent
Chin et al.

(10) Patent No.: US 8,126,014 B2
(45) Date of Patent: Feb. 28, 2012

(54) METHODS AND APPARATUS FOR IMPROVED DECODING OF HYBRID AUTOMATIC REPEAT REQUEST TRANSMISSIONS

(75) Inventors: Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 792 days.

(21) Appl. No.: 12/100,373

(22) Filed: Apr. 9, 2008

(65) Prior Publication Data

US 2009/0257372 A1    Oct. 15, 2009

(51) Int. Cl.
*H04J 3/24* (2006.01)
(52) U.S. Cl. ......................................... 370/473
(58) Field of Classification Search .................. 370/328, 370/338, 349, 469–476; 714/746, 748–751, 714/758
See application file for complete search history.

(56) References Cited

U.S. PATENT DOCUMENTS

| | | | |
|---|---|---|---|
| 6,331,829 B2 | 12/2001 | Kawai | |
| 6,954,891 B1 | 10/2005 | Jha | |
| 6,967,930 B2 | 11/2005 | Burmeister et al. | |
| 7,051,262 B2 | 5/2006 | Wang et al. | |
| 7,126,950 B2 | 10/2006 | Takagi et al. | |
| 7,366,122 B2 * | 4/2008 | Lee et al. | 370/310.1 |
| 7,571,358 B2 * | 8/2009 | Yi et al. | 714/48 |
| 8,010,880 B2 | 8/2011 | Ko et al. | |
| 2005/0201416 A1 | 9/2005 | Chang et al. | |
| 2005/0207446 A1 | 9/2005 | Hadad | |
| 2006/0041820 A1 * | 2/2006 | Hang et al. | 714/758 |
| 2007/0189226 A1 | 8/2007 | Roh et al. | |
| 2007/0211758 A1 | 9/2007 | Aarnio | |
| 2007/0214399 A1 | 9/2007 | Lim et al. | |
| 2008/0002565 A1 * | 1/2008 | Spencer | 370/204 |
| 2008/0002567 A1 | 1/2008 | Bourlas et al. | |
| 2009/0219851 A1 * | 9/2009 | Abraham et al. | 370/315 |

FOREIGN PATENT DOCUMENTS

| | | |
|---|---|---|
| EP | 0942569 | 9/1999 |
| EP | 1811710 | 7/2007 |
| WO | WO2004088879 | 10/2004 |
| WO | WO2007104686 | 9/2007 |

OTHER PUBLICATIONS

Liu et al, Courtesy Piggybacking: Support Differentiated Services in Multihop Mobile Ad Hoc Networks, IEEE, 14 pages, 2004.*

(Continued)

*Primary Examiner* — Frank Duong
(74) *Attorney, Agent, or Firm* — Charles Chesney

(57) ABSTRACT

A method for improved decoding of hybrid automatic repeat request (H-ARQ) transmissions may include attempting to verify a physical layer (PHY) cyclic redundancy check (CRC) for a candidate H-ARQ encoder packet. If the PHY CRC is not verified, medium access control layer protocol data units (MPDUs) may be identified in the candidate H-ARQ encoder packet, and attempts may be made to verify a medium access control layer (MAC) CRC for each MPDU in the candidate H-ARQ encoder packet.

27 Claims, 8 Drawing Sheets

OTHER PUBLICATIONS

International Search Report and the Written Opinion—PCT/US2009/039897, International Search Authority—European Patent Office—Sep. 14, 2009.

Liu, J. et al.: "Courtesy Piggybacking: Supporting Differentiated Services in Multihop Mobile Ad Hoc Networks," IEEE Transactions on Mobile Computing, vol. 3, No. 4, IEEE Service Center, Los Alamitos, CA, (Oct. 1, 2004), pp. 380-393, XP011120860; ISSN: 1536-1233, Sections 4.2 and 4.3.3.

Sheu, Shiann-Tsong et al.: "An Improved Data Flushing MAC Protocol for IEEE 802.11 Wireless Ad Hoc Network," VTC 2002—Fall. 2002 IEEE 56th Vehicular Technology Conference Proceedings. Vancouver, Canada, Sep. 24-28, 2002; [IEEE Vehicular Technolgy Conference], New York, NY: IEEE, US, vol. 4, (Sep. 24, 2002), pp. 2435-2439; XP010608871; ISBN: 978-0-7803-7467-6 the whole document.

* cited by examiner

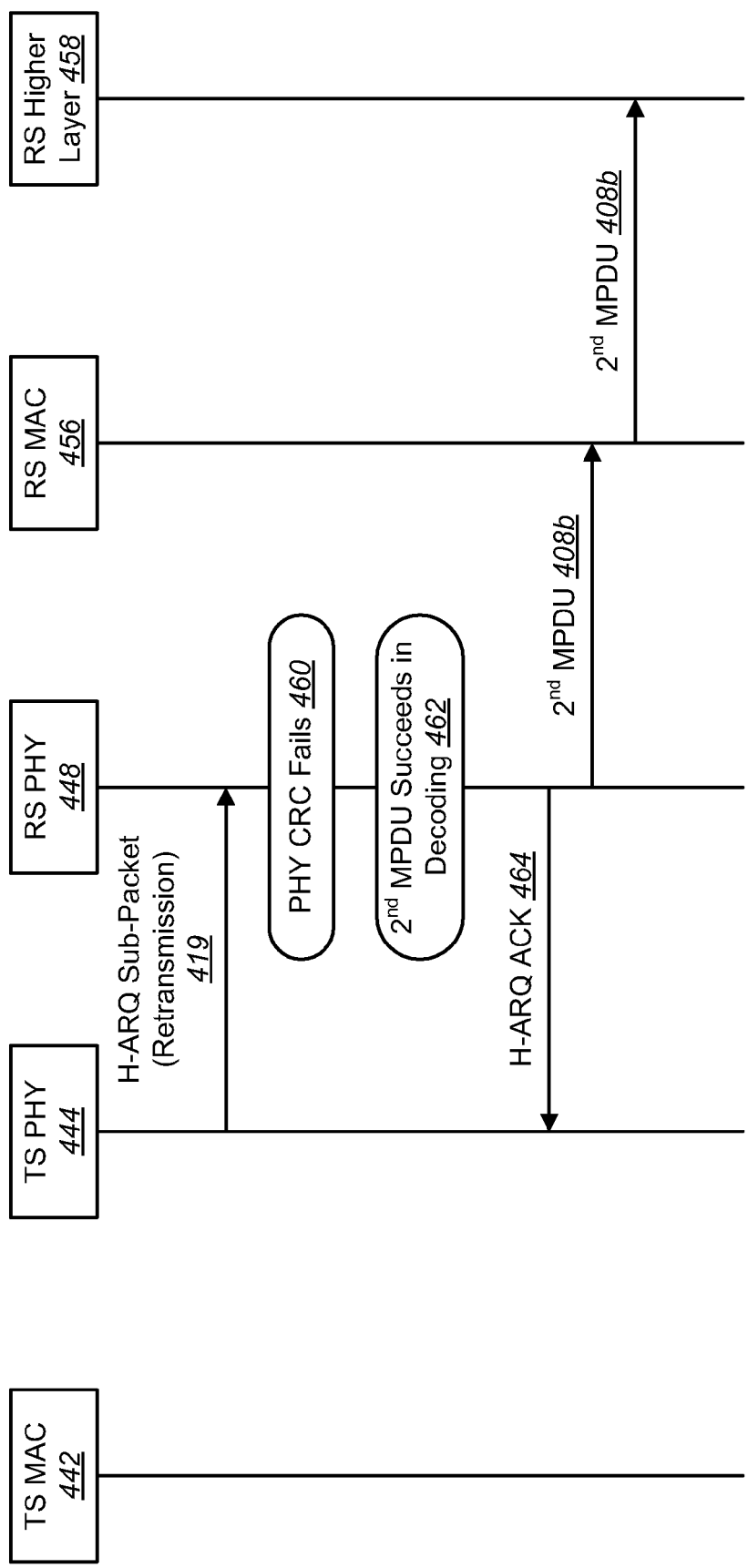
FIG. 4 (ctd.)

METHODS AND APPARATUS FOR IMPROVED DECODING OF HYBRID AUTOMATIC REPEAT REQUEST TRANSMISSIONS

TECHNICAL FIELD

The present disclosure relates generally to wireless communication systems. More specifically, the present disclosure relates to methods and apparatus for improved decoding of hybrid automatic repeat request transmissions.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. A wireless communication device may be referred to as a mobile station, a subscriber station, an access terminal, a remote station, a user terminal, a terminal, a subscriber unit, user equipment, etc. The term "mobile station" will be used herein.

A wireless communication system may provide communication for a number of cells, each of which may be serviced by a base station. A base station may be a fixed station that communicates with mobile stations. A base station may alternatively be referred to as an access point, a Node B, or some other terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station. A wireless communication system may simultaneously support communication for multiple mobile stations.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

BRIEF SUMMARY OF THE INVENTION

Figure 1:
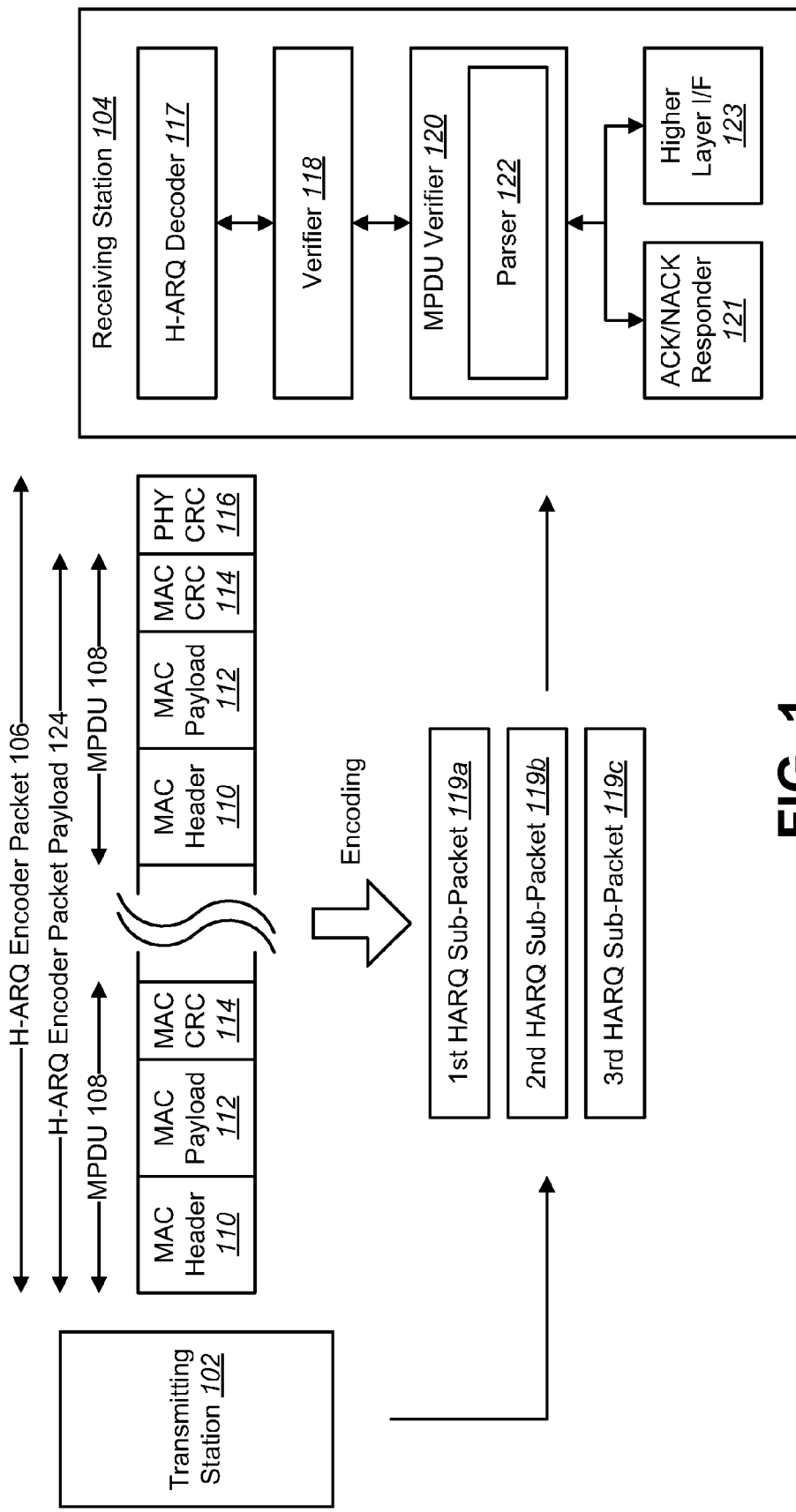
FIG. 1 illustrates an example of a receiving station that may be configured to implement the improved hybrid automatic repeat request (H-ARQ) decoding techniques of the present disclosure.

Certain aspects of the present disclosure provide techniques that may be utilized in a broadband wireless communication system. Such techniques may involve attempting to verify a physical layer (PHY) cyclic redundancy check (CRC) for a candidate H-ARQ encoder packet, identifying medium access control layer protocol data units (MPDUs) in the candidate H-ARQ encoder packet if the PHY CRC is not verified, and attempting to verify a medium access control layer (MAC) CRC for each MPDU in the candidate H-ARQ encoder packet if the PHY CRC is not verified.

DETAILED DESCRIPTION

A Medium Access Control (MAC) layer may process data as MAC protocol data units (MPDUs). Under some circumstances, multiple MPDUs may be concatenated in the same downlink or uplink burst of data.

For hybrid automatic repeat request (H-ARQ) encoding, a single MPDU or multiple concatenated MPDUs may be padded with a few "1" bits to become an allowable payload size. Then a 16-bit cyclic redundancy check (CRC) may be added to become an H-ARQ encoder packet. The H-ARQ encoder packet may then be encoded. This may result in one sub-packet (if a chase combining (CC) H-ARQ scheme is used) or multiple H-ARQ sub-packets (if an incremental redundancy (IR) H-ARQ scheme is used).

Initially, one sub-packet is transmitted. At the receiver, the sub-packet is decoded. Decoding results in a candidate H-ARQ encoder packet being constructed. The receiver then attempts to verify the 16-bit PHY CRC in the candidate H-ARQ encoder packet to detect any errors. If the PHY CRC is not verified, then another sub-packet is transmitted. If a CC H-ARQ scheme is used, the same sub-packet is retransmitted. If an IR H-ARQ scheme is used, then a different sub-packet is transmitted. At the receiver, the decoder may combine all previously received sub-packets for the same H-ARQ encoder packet to improve the chance of successful decoding. Decoding results in another candidate H-ARQ encoder packet being constructed. The receiver then attempts to verify the 16-bit PHY CRC in the candidate H-ARQ encoder packet to detect any errors. If the PHY CRC is not verified, then another sub-packet is transmitted, and the process described above is repeated.

With known approaches, the receiver does not decode any of the MPDUs in the candidate H-ARQ encoder packet if the PHY CRC fails. Instead, the H-ARQ decoder waits for the sub-packet to be re-transmitted and to arrive at the receiver before any further processing is performed. If the maximum number of re-transmitted sub-packets are received and the PHY CRC still fails, further attempts are not made, and the MPDU or concatenated MPDUs are not received successfully.

The present disclosure relates to improved techniques for H-ARQ decoding. Whenever the PHY CRC fails, it does not mean that all the MPDUs fail. Some of the MPDUs may succeed in transmission. The present disclosure proposes to continue decoding the concatenated MPDUs of a candidate H-ARQ encoder packet even if the PHY CRC has failed. When all MPDUs have been successfully decoded, it is possible that H-ARQ transmission may be able to terminate early.

A method for improved decoding of hybrid automatic repeat request (H-ARQ) transmissions is disclosed. In accordance with this method, a receiving station may attempt to verify a physical layer (PHY) cyclic redundancy check (CRC) for a candidate H-ARQ encoder packet. If the PHY CRC is not verified, the receiving station may identify medium access control layer protocol data units (MPDUs) in the candidate H-ARQ encoder packet. The receiving station may attempt to verify a medium access control layer (MAC) CRC for each MPDU in the candidate H-ARQ encoder packet if the PHY CRC is not verified.

A wireless device that is configured for improved decoding of hybrid automatic repeat request (H-ARQ) transmissions is also disclosed. The wireless device may include a verifier that attempts to verify a physical layer (PHY) cyclic redundancy check (CRC) for a candidate H-ARQ encoder packet. The wireless device may also include a parser that identifies medium access control layer protocol data units (MPDUs) in the candidate H-ARQ encoder packet if the PHY CRC is not verified. The wireless device may also include an MPDU verifier that attempts to verify a medium access control layer (MAC) CRC for each MPDU in the candidate H-ARQ encoder packet if the PHY CRC is not verified.

An apparatus that is configured for improved decoding of hybrid automatic repeat request (H-ARQ) transmissions is also disclosed. The apparatus may include means for attempting to verify a physical layer (PHY) cyclic redundancy check (CRC) for a candidate H-ARQ encoder packet. The apparatus may also include means for identifying medium access control layer protocol data units (MPDUs) in the candidate H-ARQ encoder packet if the PHY CRC is not verified. The apparatus may also include means for attempting to verify a medium access control layer (MAC) CRC for each MPDU in the candidate H-ARQ encoder packet if the PHY CRC is not verified.

A computer-program product for improved decoding of hybrid automatic repeat request (H-ARQ) transmissions is also disclosed. The computer-program product may include a computer-readable medium having instructions thereon. The instructions may include code for attempting to verify a physical layer (PHY) cyclic redundancy check (CRC) for a candidate H-ARQ encoder packet. The instructions may also include code for identifying medium access control layer protocol data units (MPDUs) in the candidate H-ARQ encoder packet if the PHY CRC is not verified. The instructions may also include code for attempting to verify a medium access control layer (MAC) CRC for each MPDU in the candidate H-ARQ encoder packet if the PHY CRC is not verified.

The methods and apparatus of the present disclosure may be utilized in a broadband wireless communication system. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

There are two main applications of WiMAX today: fixed WiMAX and mobile WiMAX. Fixed WiMAX applications are point-to-multipoint, enabling broadband access to homes and businesses. Mobile WiMAX offers the full mobility of cellular networks at broadband speeds.

Some of the examples described herein are relevant to wireless communication systems that are configured in accordance with WiMAX standards. However, these examples should not be interpreted as limiting the scope of the present disclosure.

FIG. 1 illustrates a transmitting station 102 in wireless electronic communication with a receiving station 104. The receiving station 104 may be configured to implement the improved hybrid automatic repeat request (H-ARQ) decoding techniques of the present disclosure.

The transmitting station 102 may be a base station, and the receiving station 104 may be a mobile station. Alternatively, the transmitting station 102 may be a mobile station, and the receiving station 104 may be a base station.

As shown, an H-ARQ encoder packet 106 may include multiple concatenated medium access control layer protocol data units (MPDUs) 108. Each MPDU 108 may include a medium access control layer (MAC) header 110, a MAC payload 112, and a MAC cyclic redundancy check (CRC) 114. The H-ARQ encoder packet 106 may also include a physical layer (PHY) CRC 116.

The H-ARQ encoder packet 106 may be encoded. This may result in one sub-packet 119 (if a chase combining (CC) H-ARQ scheme is used) or multiple H-ARQ sub-packets 119 (if an incremental redundancy (IR) H-ARQ scheme is used). In FIG. 1, it is assumed that an IR H-ARQ scheme is being used, so multiple H-ARQ sub-packets 119a-c are shown.

Initially, one sub-packet 119 is transmitted. At the receiving station 104, the sub-packet is decoded by an H-ARQ decoder 117. Decoding results in a candidate H-ARQ encoder packet 106 being constructed. A verifier 118 at the receiving station 104 may then attempt to verify the 16-bit PHY CRC 116 in the candidate H-ARQ encoder packet 106 to detect any errors.

In accordance with the present disclosure, if the PHY CRC 116 for the candidate H-ARQ encoder packet 106 is not verified, the receiving station 104 does not simply wait for the sub-packet 119 to be retransmitted, as with known H-ARQ methods. The receiving station 104 may include an MPDU verifier 120 that attempts to verify the MAC CRC 114 for each of the MPDUs 108 in the candidate H-ARQ encoder packet 106. In other words, notwithstanding the fact that the PHY CRC 116 for the candidate H-ARQ encoder packet 106 was not verified, it may still be possible to verify the MAC CRC 114 for one or more of the MPDUs 108 in the candidate H-ARQ encoder packet 106.

As part of the process of attempting to verify the MAC CRC 114 for the individual MPDUs 108, a parser 122 may parse the payload 124 of the candidate H-ARQ encoder packet 106 to identify the headers 110 of the MPDUs 108 in the candidate H-ARQ encoder packet 106. The header 110 for a particular MPDU 108 may identify the length of that MPDU 108. Thus, by identifying the headers 110 of the MPDUs 108, the receiving station 104 may be able to determine the boundaries of the MPDUs 108 in the candidate H-ARQ encoder packet 106.

When the boundaries of the MPDUs 108 have been identified, the MPDU verifier 120 may attempt to verify the MAC CRC 114 of each of the MPDUs 108 in the candidate H-ARQ encoder packet 106. The MPDUs 108 whose MAC CRC 114 is verified may then be passed to a higher layer for further processing. The receiving station 104 may include a higher layer interface 123 for providing this functionality.

If all of the MPDUs 108 in the candidate H-ARQ encoder packet 106 are verified, then the receiving station 104 may send back an acknowledgement message (ACK) to the transmitting station 102. However, if at least one MPDU 108 in the candidate H-ARQ encoder packet 106 is not verified, then the receiving station 104 may send a negative acknowledgement (NACK) to the transmitting station 102, so that the sub-packet 119 will be retransmitted. The receiving station 104 may include an ACK/NACK responder 121 for sending ACK messages and NACK messages to the transmitting station 102, as appropriate.

When the receiving station receives retransmission(s) of the sub-packet 119, the process described above may be repeated. In particular, the sub-packet 119 may be decoded by an H-ARQ decoder 117. Decoding results in a candidate H-ARQ encoder packet 106 being constructed. A verifier 118 at the receiving station 104 may then attempt to verify the 16-bit PHY CRC 116 in the candidate H-ARQ encoder packet 106 to detect any errors. If the PHY CRC 116 is not verified, then an MPDU verifier 120 may attempt to verify the CRC 114 for each previously unverified MPDU 108 in the candidate H-ARQ encoder packet 106.

The H-ARQ decoding techniques described in the present disclosure may allow early termination of H-ARQ transmission relative to known H-ARQ methods. In addition, it may allow at least some of the MPDUs 108 within a candidate H-ARQ encoder packet 106 to be delivered to higher layers more quickly than would otherwise occur with known H-ARQ methods. An example illustrating these potential advantages will be described below.

WiMAX standards define two types of MPDUs 108: generic and signaling. The signaling MPDU 108 does not have any payload, and it has a 6-octet header 110 only. The generic MPDU 108 has a 6-octet header 110, a payload 112, and a 32-bit CRC 114.

Figure 2:
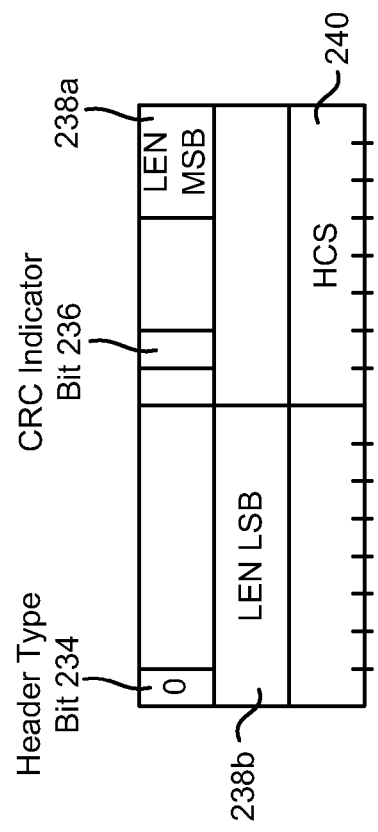
FIG. 2 illustrates an example of a generic header.

FIG. 2 illustrates a generic header 210. As shown, the generic header 210 may include a header type bit 234. In accordance with the WiMAX standards, if the value of the header type bit 234 is zero, this corresponds to a generic header 210.

The generic header 210 may also include a CRC indicator bit 236. The CRC indicator bit 236 identifies whether or not a CRC 114 is included in the MPDU 108.

The generic header 210 may also include a length field 238. FIG. 2 shows the most significant bits (MSBs) of the length field 238a and the least significant bits (LSBs) of the length field 238b.

The generic header 210 may also include a header check sequence (HCS) 240. The HCS 240 may be used to detect corruption of the header 210 during transmission.

Figure 3:
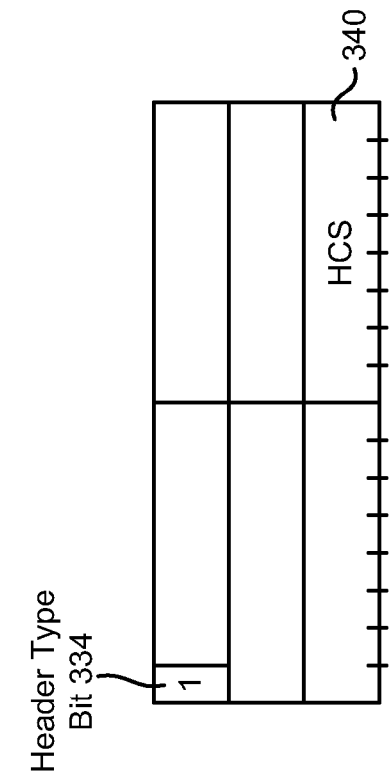
FIG. 3 illustrates an example of a signaling header.

FIG. 3 illustrates a signaling header 316. As shown, the signaling header 316 may include a header type bit 334. In accordance with the WiMAX standards, if the value of the header type bit 334 is one, this corresponds to a signaling header 316. The signaling header 316 may also include an HCS 340. Since the signaling MPDU does not have a payload 112 or a 32-bit CRC 114, it can be verified by an HCS 340.

Figure 4:
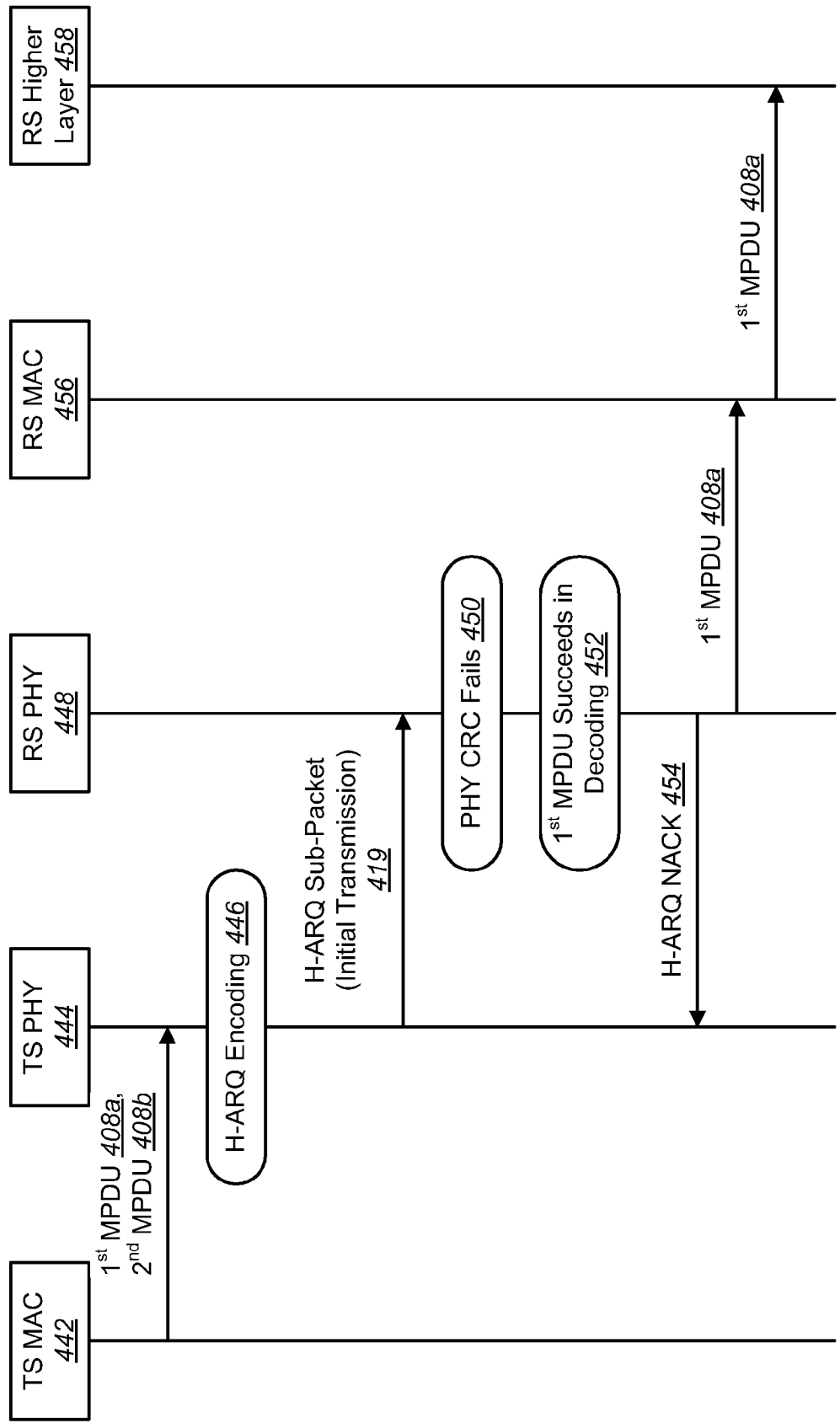
FIG. 4 illustrates an example of H-ARQ decoding techniques in accordance with the present disclosure.

FIG. 4 illustrates an example showing an example of an H-ARQ decoding technique in accordance with the present disclosure. This example will be described in terms of a transmitting station 102 and a receiving station 104. As indicated above, the transmitting station 102 may be a base station, and the receiving station 104 may be a mobile station. Alternatively, the transmitting station 102 may be a mobile station, and the receiving station 104 may be a base station.

The MAC layer 442 of the transmitting station 102 (TS MAC 442) may send a first MPDU 408a and a second MPDU 408b to the physical layer 444 of the transmitting station (TS PHY 444). The TS PHY 444 may perform H-ARQ encoding 446, which may involve creating one or more H-ARQ sub-packets 419.

The TS PHY 444 may send the H-ARQ sub-packet 419 to the physical layer 448 of the receiving station 104 (RS PHY 448). The RS PHY 448 may perform H-ARQ decoding with respect to the H-ARQ sub-packet 419, resulting in a candidate H-ARQ encoder packet 106 being created. The RS PHY 448 may attempt to verify the PHY CRC 116 within the candidate H-ARQ encoder packet 106. In this example, it will be assumed that the PHY CRC 116 fails 450, i.e., that the RS PHY 448 was unable to verify the PHY CRC 116.

In accordance with the present disclosure, the RS PHY 448 does not simply wait for the H-ARQ sub-packet 419 to be retransmitted, as with known H-ARQ methods. Instead, the RS PHY 448 identifies the MPDUs 408a-b in the candidate H-ARQ encoder packet 106, and then it attempts to verify the MAC CRC 114 for each of the MPDUs 408a-b in the candidate H-ARQ encoder packet 106. In this example, it will be assumed that the RS PHY 448 is able to successfully verify the MAC CRC 114 of the first MPDU 408a, but the RS PHY 448 is not able to successfully verify the MAC CRC 114 of the second MPDU 408b. Thus, the first MPDU 408a is successfully decoded 452, but the second MPDU 408b is not successfully decoded.

Because the MAC CRC 114 of the second MPDU 408b was not verified, the RS PHY 448 may send an H-ARQ NACK 454 back to the TS PHY 444. However, because the MAC CRC 114 of the first MPDU 408a was verified, the RS PHY 448 may send the first MPDU 408a to the MAC layer 456 of the receiving station 104 (RS MAC 456). The RS MAC 456 may send the first MPDU 408a to a higher layer 458 at the receiving station 104 (RS higher layer 458).

The TS PHY 444 may retransmit the H-ARQ sub-packet 419 to the RS PHY 448. The RS PHY 448 may combine the H-ARQ sub-packet 419 with the previously transmitted H-ARQ sub-packet 419. The RS PHY 448 may then perform H-ARQ decoding, resulting in another candidate H-ARQ encoder packet 106 being created. The RS PHY 448 may attempt to verify the PHY CRC 116 within the candidate H-ARQ encoder packet 106. In this example, it will be assumed that the PHY CRC 116 fails 460 once again, i.e., that the RS PHY 448 was once again unable to verify the PHY CRC 116 in the candidate H-ARQ encoder packet 106.

The RS PHY 448 then identifies the MPDUs 408a-b in the candidate H-ARQ encoder packet 106, and attempts to verify the MAC CRC 114 for each of the previously unverified MPDUs 408a-b in the candidate H-ARQ encoder packet 106. In this case, the RS PHY 448 attempts to verify the MAC CRC 114 for the second MPDU 408b. In this example, it will be assumed that the RS PHY 448 is able to successfully verify the MAC CRC 114 of the second MPDU 408b. Thus, the second MPDU 408b is successfully decoded 462.

Because the MAC CRC 114 of the second MPDU 408b was verified, the RS PHY 448 may send an H-ARQ ACK 464 back to the TS PHY 444. The RS PHY 448 may also send the second MPDU 408b to the RS MAC 456. The RS MAC 456 may send the second MPDU 408b to an RS higher layer 458.

The example shown in FIG. 4 illustrates certain potential advantages of the H-ARQ methods described herein. For instance, in the example of FIG. 4, the H-ARQ transmission was terminated early relative to known H-ARQ methods. With known H-ARQ methods, retransmission of the H-ARQ sub-packet 419 occurs until the PHY CRC 116 in the candidate H-ARQ encoder packet 106 is verified, or until the maximum number of retransmission attempts is reached. In contrast, in the example of FIG. 4, the H-ARQ transmission was able to be terminated after the H-ARQ sub-packet 419 was transmitted only twice, even though the PHY CRC 116 of the candidate H-ARQ encoder packet 106 was never verified.

Another advantage is that the first and second MPDUs 408a-b were able to be delivered to the RS higher layer 458 earlier than they would be with known H-ARQ methods. With known H-ARQ methods, once the PHY CRC 116 fails, then the receiving station 104 simply waits for the H-ARQ sub-packet 419 to be retransmitted, and no attempt is made to verify the MAC CRC 114 of the individual MPDUs 108 in the candidate H-ARQ encoder packet 406. In contrast, in the example of FIG. 4, the first and second MPDUs 408a-b were verified even though the PHY CRC 116 of the candidate H-ARQ encoder packet 106 was never verified. Thus, the first and second MPDUs 408a-b were able to be delivered to the RS higher layer 458 before they would have been with known H-ARQ methods.

Figure 5:
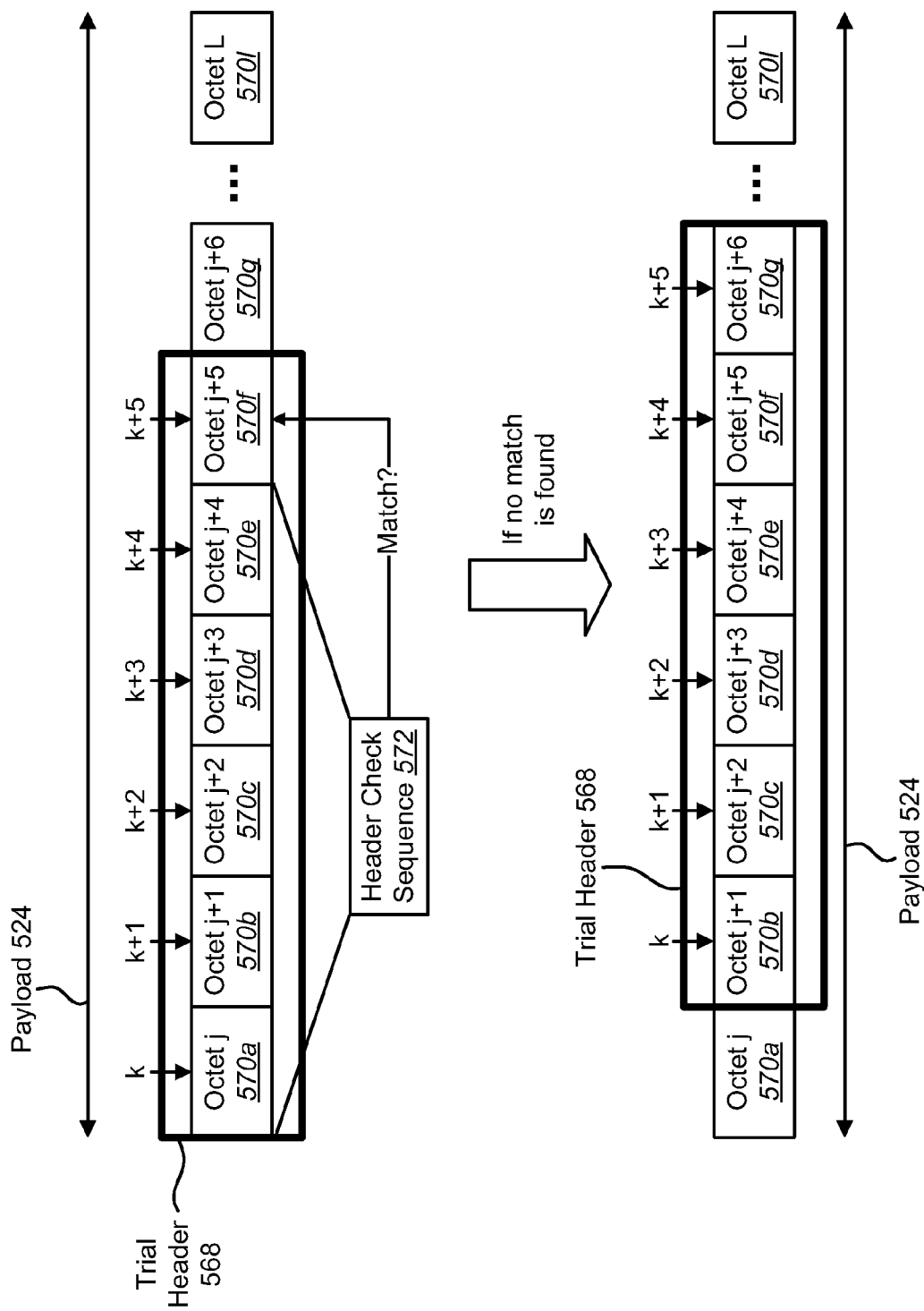
FIG. 5 illustrates an example showing certain aspects of a header search algorithm that may be used in accordance with the present disclosure.

As indicated above, as part of the process of attempting to verify the MAC CRC 114 for the individual MPDUs 108, a parser 122 may parse the payload 124 of the candidate H-ARQ encoder packet 106 to identify the headers 110 of the MPDUs 108 in the candidate H-ARQ encoder packet 106. FIG. 5 illustrates an example showing certain aspects of a header search algorithm that may be used. The parser 122 may be configured to operate in accordance with the depicted example.

A payload 524 of a candidate H-ARQ encoder packet 106 is shown in FIG. 5. The payload 524 may include multiple concatenated MPDUs 108, as described above.

The octets 570a-l within the payload 524 may be denoted with indices j, j+1, . . . , L. The octet 570a with index j may be the first octet 570a in the payload 524. The octet 570l with index L may be the last octet 570l within the payload 524.

A search index k may be defined. The header search may begin from search index k=j.

A trial header 568 may be formed. As indicated above, the header 110 within an MPDU 108 may include six octets 570. Thus, the trial header 568 may also include six octets 570. More specifically, the trial header 568 may include the six octets 570a-f corresponding to search indices k, k+1, k+2, k+3, k+4, and k+5.

The first five octets 570a-e in the trial header 568 may be used to calculate a header check sequence 572. If the sixth octet 570f in the trial header 568 matches the header check sequence 572 that is calculated, then it may be concluded that the trial header 568 corresponds to the header 110 of an MPDU 108 in the payload 524.

However, if the sixth octet 570f in the trial header 568 does not match the header check sequence 572 that is calculated, then the search index k may be incremented, so that k=j+1. A new trial header 568 may be formed, which may include the six octets 570b-g. This is shown in the bottom portion of FIG. 5. The process described above may then be repeated.

Thus, the portion of the received payload 524 of data that corresponds to the trial header 568 may be shifted in accordance with a "sliding window" approach. This may continue until a match is found between the header check sequence 572 calculated using the first five octets 570 of the trial header 568, and the value of the sixth octet 570 in the trial header 570. Once this type of match has been found, then it may be concluded that the header 110 of an MPDU 108 in the payload 524 has been found. In other words, the header search algorithm involves attempting one or more trial headers 568 until a trial header 568 is found that includes a verifiable header check sequence 572.

Under some circumstances, a match may not be found. This may be the case, for example, when all of the MPDUs 108 within a candidate H-ARQ encoder packet 106 have been corrupted. Whenever the search index k is incremented, it may be determined whether k>L−5. If so, then it may be concluded that the header search has failed.

Figure 6:
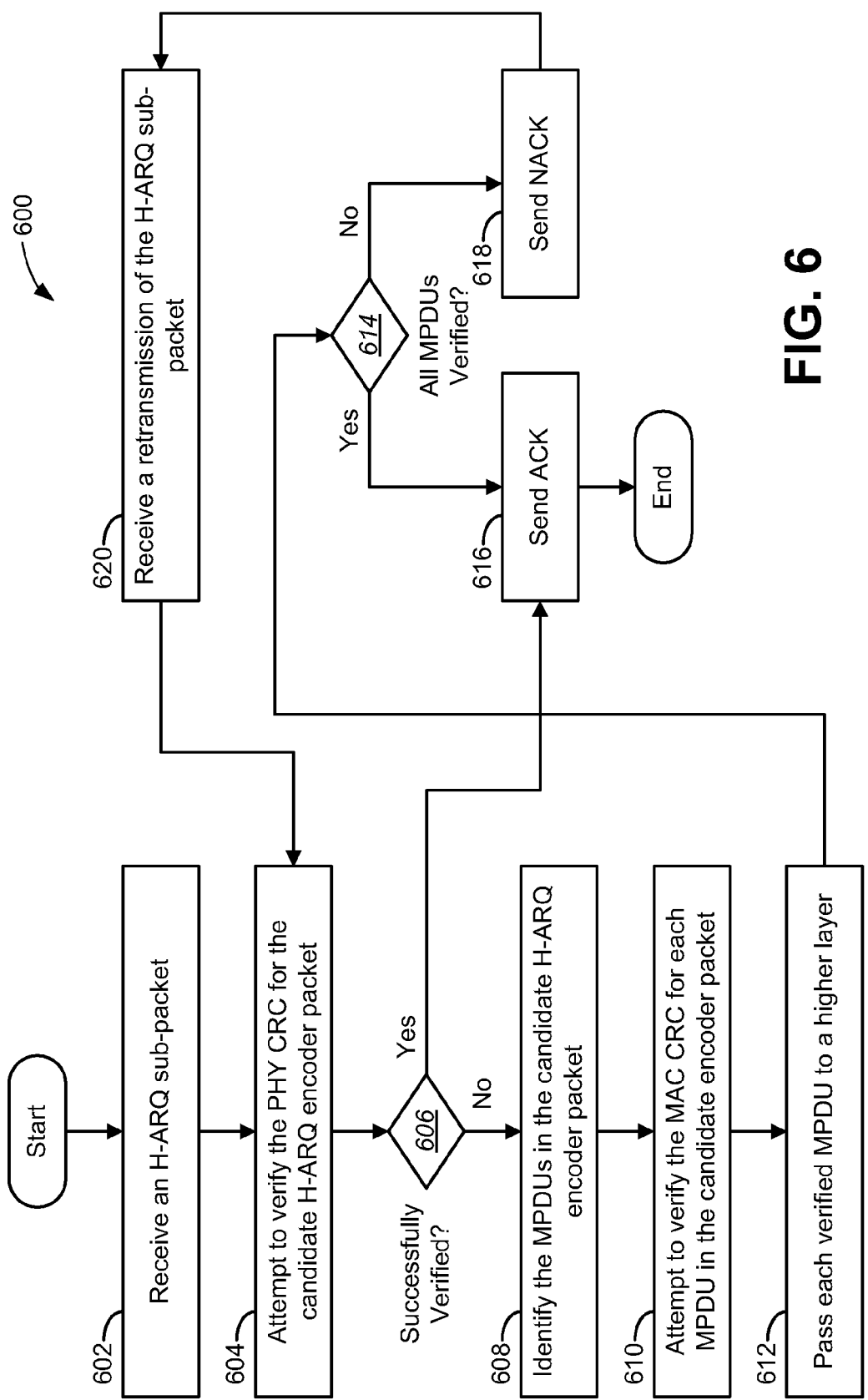
FIG. 6 illustrates an example of a method for improved decoding of H-ARQ transmissions.

FIG. 6 illustrates an example of a method 600 for improved H-ARQ decoding in accordance with the present disclosure. The method may be implemented by a receiving station 104. The receiving station 104 may be a mobile station that receives H-ARQ transmissions from a base station. Alternatively, the receiving station 104 may be a base station that receives H-ARQ transmissions from a mobile station.

When an H-ARQ sub-packet 119 is received 602, H-ARQ decoding may result in a candidate H-ARQ encoder packet 106 being created. A verifier 118 at the receiving station 104 may attempt to verify 604 the PHY CRC 116 for the candidate H-ARQ encoder packet 106. If the PHY CRC 116 is successfully verified 606, then an ACK may be sent 616 back to the transmitting station 102.

If the PHY CRC 116 is not successfully verified 606, then a parser 122 at the receiving station 104 may identify 608 the MPDUs 108 in the candidate H-ARQ encoder packet 106. The header search algorithm shown in FIG. 5 may be used to identify 608 the MPDUs 108 in the candidate H-ARQ encoder packet 106. Alternatively, the parser 122 may utilize a different mechanism for identifying 608 the MPDUs 108.

An MPDU verifier 120 at the receiving station 104 may attempt 610 to verify the MAC CRC 114 for each MPDU 108 in the candidate H-ARQ encoder packet 106. Each MPDU 108 whose CRC 114 is successfully verified may be passed 612 to a higher layer.

If all of the MPDUs 108 have been verified, then an ACK may be sent 616 back to the transmitting station 102. It may be determined 614 that all of the MPDUs 108 have been verified if any of the following four cases apply:

Case 1: All the successfully parsed MAC PDUs 108 can cover the size of the payload 124.

Case 2: All the successfully parsed MAC PDUs 108 can form a continuous octet sequence starting from the beginning of the H-ARQ encoder packet. The number of remaining bits of the payload is smaller than the length of the MAC PDU header 110 (i.e., 48 bits).

Case 3: All the successfully parsed MAC PDUs 108 can form a continuous octet sequence starting from the beginning of the H-ARQ encoder packet. The remaining bits of the payload are all "1" (i.e., padding bits).

Case 4: All the successfully parsed MAC PDUs 108 can form a continuous octet sequence starting from the beginning of the H-ARQ encoder packet, but none of the above cases 1, 2, or 3 applies. If the remaining bits of the payload are replaced by "1" to be the padding of the proposed packet payload, then the 16-bit PHY CRC of this proposed payload is the same as the CRC portion of the H-ARQ decoder output packet.

If it is determined 614 that there are additional MPDUs 108 that have not been verified, then a NACK may be sent 618 to the transmitting station 102. The transmitting station 102 may then retransmit the H-ARQ sub-packet 119. When the retransmitted H-ARQ sub-packet 119 is received 620, H-ARQ decoding may occur, another candidate H-ARQ encoder packet 106 may be created, the verifier 118 may attempt to verify 604 the PHY CRC 116 for the candidate H-ARQ encoder packet 106, and the process described above may be repeated.

Figure 7:
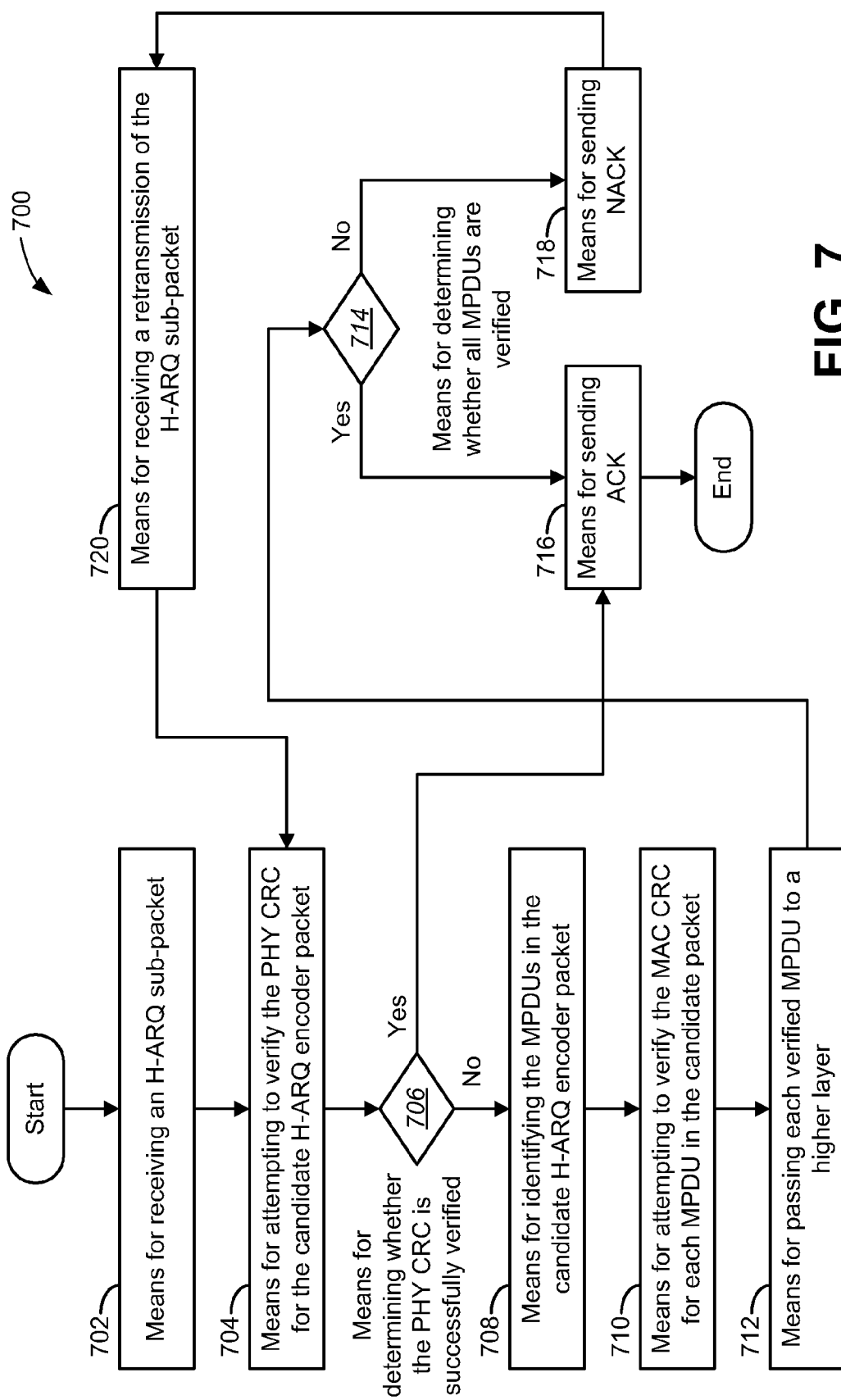
FIG. 7 illustrates means-plus-function blocks corresponding to the method of FIG. 6.

The method 600 of FIG. 6 described above may be performed by various hardware and/or software component(s)

and/or module(s) corresponding to the means-plus-function blocks 700 illustrated in FIG. 7. In other words, blocks 600 through 618 illustrated in FIG. 6 correspond to means-plus-function blocks 700 through 718 illustrated in FIG. 7.

Figure 8:
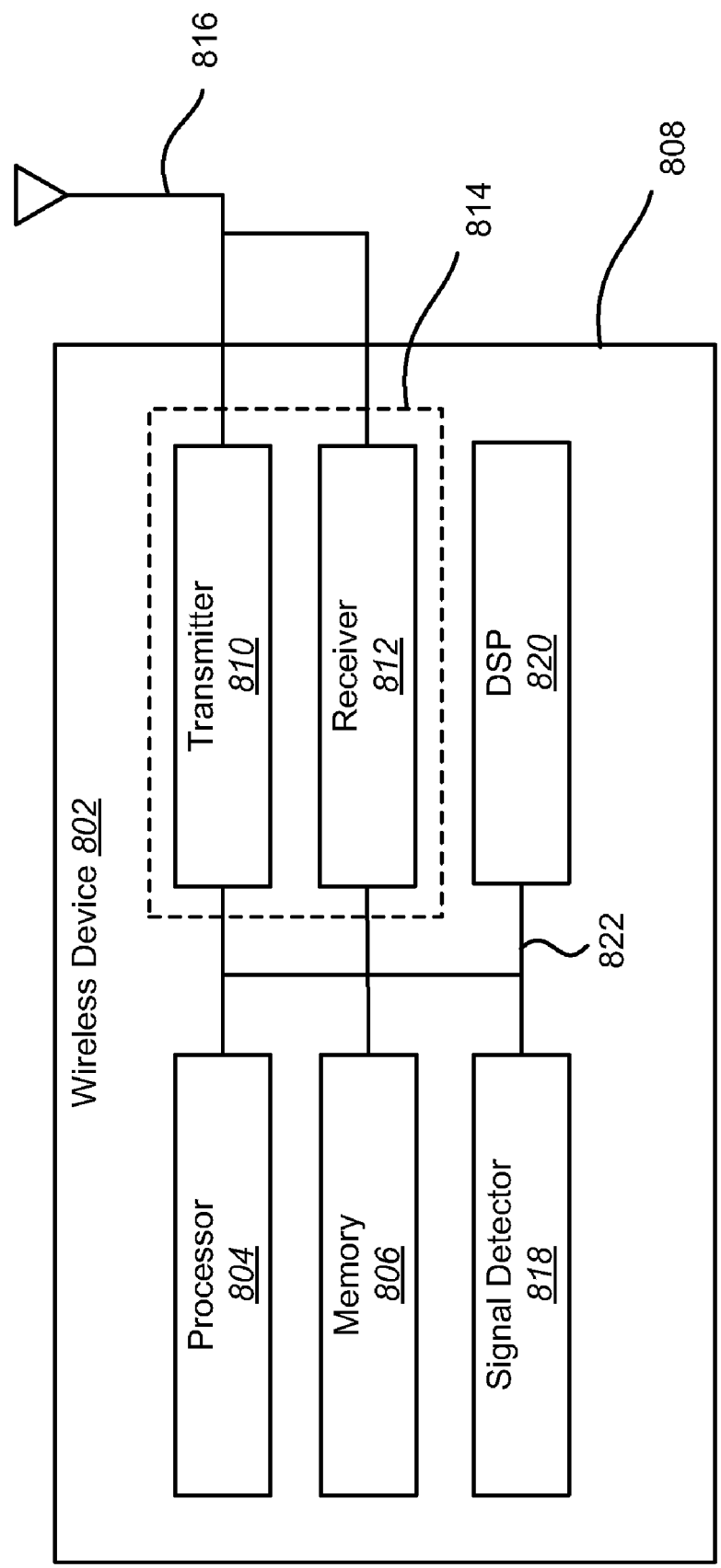
FIG. 8 illustrates various components that may be utilized in a wireless device.

FIG. 8 illustrates various components that may be utilized in a wireless device 802. The wireless device 802 is an example of a device that may be configured to implement the various methods described herein. The wireless device 802 may be a transmitting station 102 or a receiving station 104.

The wireless device 802 may include a processor 804 which controls operation of the wireless device 802. The processor 804 may also be referred to as a central processing unit (CPU). Memory 806, which may include both read-only memory (ROM) and random access memory (RAM), provides instructions and data to the processor 804. A portion of the memory 806 may also include non-volatile random access memory (NVRAM). The processor 804 typically performs logical and arithmetic operations based on program instructions stored within the memory 806. The instructions in the memory 806 may be executable to implement the methods described herein.

The wireless device 802 may also include a housing 808 that may include a transmitter 810 and a receiver 812 to allow transmission and reception of data between the wireless device 802 and a remote location. The transmitter 810 and receiver 812 may be combined into a transceiver 814. An antenna 816 may be attached to the housing 808 and electrically coupled to the transceiver 814. The wireless device 802 may also include (not shown) multiple transmitters, multiple receivers, multiple transceivers and/or multiple antenna.

The wireless device 802 may also include a signal detector 818 that may be used to detect and quantify the level of signals received by the transceiver 814. The signal detector 818 may detect such signals as total energy, pilot energy per pseudonoise (PN) chips, power spectral density, and other signals. The wireless device 802 may also include a digital signal processor (DSP) 820 for use in processing signals.

The various components of the wireless device 802 may be coupled together by a bus system 822 which may include a power bus, a control signal bus, and a status signal bus in addition to a data bus. However, for the sake of clarity, the various buses are illustrated in FIG. 8 as the bus system 822.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, components, modules and circuits described in connection with the present disclosure may be implemented wholly or partially as instructions stored in memory that are executed by a processor. The processor may be a general purpose processor, a digital signal processor (DSP), etc. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

Alternatively, or in addition, the various illustrative logical blocks, components, modules and circuits described in connection with the present disclosure may be implemented wholly or partially in hardware. As used herein, the term "hardware" should be construed broadly to include an application specific integrated circuit (ASIC), a field programmable gate array signal (FPGA) or other programmable logic device, discrete gate or transistor logic, discrete hardware components or any combination thereof designed to perform the functions described herein.

A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 6 and 7, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for improved decoding of hybrid automatic repeat request (H-ARQ) transmissions, comprising:
    attempting to verify a physical layer (PHY) cyclic redundancy check (CRC) for a candidate H-ARQ encoder packet;
    identifying medium access control layer protocol data units (MPDUs) in the candidate H-ARQ encoder packet if the PHY CRC is not verified;
    attempting to verify a medium access control layer (MAC) CRC for each MPDU in the candidate H-ARQ encoder packet if the PHY CRC is not verified; and
    sending an acknowledgement message to a transmitting station when the MAC CRC for all MPDUs in the candidate H-ARQ encoder packet have been verified, even if the PHY CRC has not been verified.

2. The method of claim 1, further comprising forwarding each MPDU whose MAC CRC has been verified to a higher layer.

3. The method of claim 1, wherein identifying the MPDUs in the candidate H-ARQ encoder packet comprises:
    attempting one or more trial headers; and
    attempting to verify a header check sequence for each of the one or more trial headers.

4. The method of claim 1, wherein the method is implemented by a mobile station, and wherein the candidate H-ARQ encoder packet corresponds to an H-ARQ sub-packet sent by a base station.

5. The method of claim 1, wherein the method is implemented by a base station, and wherein the candidate H-ARQ encoder packet corresponds to an H-ARQ sub-packet sent by a mobile station.

6. The method of claim 1, wherein the method is implemented in a wireless communication system that supports an Institute of Electronic and Electrical Engineers (IEEE) 802.16 standard.

7. A wireless device that is configured for improved decoding of hybrid automatic repeat request (H-ARQ) transmissions, comprising:
    a verifier that attempts to verify a physical layer (PHY) cyclic redundancy check (CRC) for a candidate H-ARQ encoder packet;
    a parser that identifies medium access control layer protocol data units (MPDUs) in the candidate H-ARQ encoder packet if the PHY CRC is not verified;
    an MPDU verifier that attempts to verify a medium access control layer (MAC) CRC for each MPDU in the candidate H-ARQ encoder packet if the PHY CRC is not verified; and
    an acknowledgement/negative acknowledgement responder that sends an acknowledgement message to a transmitting station when the MAC CRC for all MPDUs in the candidate H-ARQ encoder packet has been verified, even if the PHY CRC has not been verified.

8. The wireless device of claim 7, further comprising a higher layer interface that forwards each MPDU whose MAC CRC has been verified to a higher layer.

9. The wireless device of claim 7, wherein identifying the MPDUs in the candidate H-ARQ encoder packet comprises:
    attempting one or more trial headers; and
    attempting to verify a header check sequence for each of the one or more trial headers.

10. The wireless device of claim 7, wherein the wireless device is a mobile station, and wherein the candidate H-ARQ encoder packet corresponds to an H-ARQ sub-packet sent by a base station.

11. The wireless device of claim 7, wherein the wireless device is a base station, and wherein the candidate H-ARQ encoder packet corresponds to an H-ARQ sub-packet sent by a mobile station.

12. The wireless device of claim 7, wherein the verifier, the parser, and the MPDU verifier are implemented as instructions stored in memory that are executed by a processor.

13. The wireless device of claim 7, wherein the verifier, the parser, and the MPDU verifier are implemented in hardware.

14. The wireless device of claim 7, wherein the verifier, the parser, and the MPDU verifier are implemented in an integrated circuit.

15. The wireless device of claim 7, wherein the wireless device is configured to be connected to a wireless communication system that supports an Institute of Electronic and Electrical Engineers (IEEE) 802.16 standard.

16. An apparatus that is configured for improved decoding of hybrid automatic repeat request (H-ARQ) transmissions, comprising:
    means for attempting to verify a physical layer (PHY) cyclic redundancy check (CRC) for a candidate H-ARQ encoder packet;
    means for identifying medium access control layer protocol data units (MPDUs) in the candidate H-ARQ encoder packet;
    means for attempting to verify a medium access control layer (MAC) CRC for each MPDU in the candidate H-ARQ encoder; and
    means for sending an acknowledgement message to a transmitting station if the MAC CRC for all MPDUs in the candidate H-ARQ encoder packet has been verified, even if the PHY CRC has not been verified.

17. The apparatus of claim 16, further comprising means for forwarding each MPDU whose MAC CRC has been verified to a higher layer.

18. The apparatus of claim 16, wherein the means for identifying the MPDUs in the candidate H-ARQ encoder packet comprises:
    means for attempting one or more trial headers; and
    means for attempting to verify a header check sequence for each of the one or more trial headers.

19. The apparatus of claim 16, wherein the apparatus is a mobile station, and wherein the candidate H-ARQ encoder packet corresponds to an H-ARQ sub-packet sent by a base station.

20. The apparatus of claim 16, wherein the apparatus is a base station, and wherein the candidate H-ARQ encoder packet corresponds to an H-ARQ sub-packet sent by a mobile station.

21. The apparatus of claim 16, wherein the apparatus is configured to be connected to a wireless communication system that supports an Institute of Electronic and Electrical Engineers (IEEE) 802.16 standard.

22. A non-transitory computer readable medium for improved decoding of hybrid automatic repeat request (H-ARQ) transmissions, the computer-readable medium having instructions thereon, the instructions comprising:

code for attempting to verify a physical layer (PHY) cyclic redundancy check (CRC) for a candidate H-ARQ encoder packet;

code for identifying medium access control layer protocol data units (MPDUs) in the candidate H-ARQ encoder packet if the PHY CRC is not verified;

code for attempting to verify a medium access control layer (MAC) CRC for each MPDU in the candidate H-ARQ encoder packet if the PHY CRC is not verified; and code for sending an acknowledgement message to a transmitting station when the MAC CRC for all MPDUs in the candidate H-ARQ encoder packet has been verified, even if the PHY CRC has not been verified.

23. The computer readable medium of claim 22, further comprising code for forwarding each MPDU whose MAC CRC has been verified to a higher layer.

24. The computer readable medium of claim 22, wherein the code for identifying the MPDUs in the candidate H-ARQ encoder packet comprises:

code for attempting one or more trial headers; and code for attempting to verify a header check sequence for each of the one or more trial headers.

25. The computer readable medium of claim 22, wherein the computer-readable medium is part of a mobile station, and wherein the candidate H-ARQ encoder packet corresponds to an H-ARQ sub-packet sent by a base station.

26. The computer readable medium of claim 22, wherein the computer-readable medium is part of a base station, and wherein the candidate H-ARQ encoder packet corresponds to an H-ARQ sub-packet sent by a mobile station.

27. The computer readable medium of claim 22, wherein the computer-readable medium is part of a wireless device that is configured to be connected to a wireless communication system that supports an Institute of Electronic and Electrical Engineers (IEEE) 802.16 standard.

* * * * *